United States Patent
Di Gregorio

(10) Patent No.: US 7,334,375 B2
(45) Date of Patent: Feb. 26, 2008

(54) EVACUATED PANEL FOR THERMAL INSULATION OF A BODY HAVING NON-PLANAR SURFACES

(75) Inventor: Pierattilio Di Gregorio, Sulmona (IT)

(73) Assignee: Saes Getters S.p.A., Lainate (Milan) (IT)

( * ) Notice: Subject to any disclaimer, the term of this patent is extended or adjusted under 35 U.S.C. 154(b) by 696 days.

(21) Appl. No.: 10/331,878

(22) Filed: Dec. 30, 2002

(65) Prior Publication Data

US 2003/0101672 A1    Jun. 5, 2003

Related U.S. Application Data

(63) Continuation of application No. PCT/IT01/00340, filed on Jun. 27, 2001.

(30) Foreign Application Priority Data

Jun. 30, 2000    (IT)    ............... MI2000A1489

(51) Int. Cl.
  *E04C 2/296*    (2006.01)
  *E04C 2/284*    (2006.01)
(52) U.S. Cl. ............. 52/409; 52/309.9; 52/309.14; 52/309.11; 52/784.15; 312/406; 428/72; 428/74
(58) Field of Classification Search ........... 52/309.6, 52/309.7, 309.9, 309.14, 409, 147, 309.11, 52/784.15, 794.1, 788.1, 309.15; 312/406; 428/72, 74
See application file for complete search history.

(56) References Cited

U.S. PATENT DOCUMENTS

| | | | | | |
|---|---|---|---|---|---|
| 1,626,655 | A | * | 5/1927 | Woodson | 312/406 |
| 1,802,600 | A | * | 4/1931 | Hatch | 312/406 |
| 2,794,756 | A | * | 6/1957 | Leverenz | 52/309.14 |
| 2,939,811 | A | * | 6/1960 | Dillon | 52/309.14 |
| 3,004,877 | A | * | 10/1961 | Simms et al. | 52/309.9 |
| 3,094,198 | A | * | 6/1963 | Haskins | 52/309.9 |
| 3,139,206 | A | * | 6/1964 | Matsch | 220/592.27 |
| 3,258,883 | A | * | 7/1966 | Campanaro et al | 52/794.1 |
| 3,264,165 | A | * | 8/1966 | Stickel | 52/309.14 |
| 3,379,330 | A | * | 4/1968 | Perkins, Jr. | 220/560.13 |
| 3,479,784 | A | * | 11/1969 | Massagli | 52/309.9 |
| 3,514,006 | A | * | 5/1970 | Molnar | 220/560.13 |
| 3,557,840 | A | * | 1/1971 | Maybee | 138/149 |
| 3,597,891 | A | * | 8/1971 | Martin | 52/145 |
| 3,640,796 | A | * | 2/1972 | Cotelle | 161/43 |
| 3,731,449 | A | * | 5/1973 | Kephart, Jr. | 52/631 |

(Continued)

FOREIGN PATENT DOCUMENTS

EP    0 757 920 A2    2/1997

(Continued)

*Primary Examiner*—Lanna Mai
*Assistant Examiner*—Phi Dieu Tran A
(74) *Attorney, Agent, or Firm*—Panitch Schwarze Belisario & Nadel LLP

(57) ABSTRACT

An evacuated panel is provided for thermal insulation of a body (3, 4) having non-planar surfaces, the panel having two main faces and comprising a flexible envelope (1), made of one or more barrier sheets, and a filling material formed of at least two boards (2; 2') of an open cell polymeric foam, the boards lying one over the other, and each board having a thickness between about 2 and 8 mm.

48 Claims, 2 Drawing Sheets

U.S. PATENT DOCUMENTS

| | | | |
|---|---|---|---|
| 3,824,140 A | | 7/1974 | Hofmann |
| 3,969,868 A | * | 7/1976 | Bainter et al. ............... 52/622 |
| 4,057,944 A | * | 11/1977 | Wyatt, Jr. et al. ......... 52/309.11 |
| 4,683,702 A | * | 8/1987 | Vis .............................. 53/433 |
| 4,726,707 A | * | 2/1988 | Newton ....................... 404/25 |
| 4,726,974 A | * | 2/1988 | Nowobilski et al. .......... 428/69 |
| 4,980,214 A | * | 12/1990 | Charriere ..................... 428/68 |
| 5,018,328 A | * | 5/1991 | Cur et al. .................. 52/406.2 |
| 5,034,085 A | * | 7/1991 | Brauchl ...................... 156/293 |
| 5,115,602 A | * | 5/1992 | De Larrard .................. 52/2.16 |
| 5,157,893 A | * | 10/1992 | Benson et al. ............. 52/789.1 |
| 5,175,975 A | * | 1/1993 | Benson et al. ................ 52/791 |
| 5,399,408 A | * | 3/1995 | Nowara ....................... 428/73 |
| 5,500,305 A | * | 3/1996 | Bridges et al. ............. 428/621 |
| 5,505,810 A | * | 4/1996 | Kirby et al. ................ 156/286 |
| 5,522,195 A | * | 6/1996 | Bargen ........................ 52/455 |
| 5,524,406 A | * | 6/1996 | Ragland .................... 52/406.2 |
| 5,612,111 A | * | 3/1997 | Lin .............................. 428/71 |
| 5,664,396 A | * | 9/1997 | Luman et al. ............. 52/788.1 |
| 5,678,384 A | * | 10/1997 | Maze ...................... 52/783.17 |
| 5,792,539 A | * | 8/1998 | Hunter ......................... 428/72 |
| 5,843,353 A | | 12/1998 | De Vos et al. |
| 5,977,197 A | * | 11/1999 | Malone ...................... 521/146 |
| 6,037,033 A | * | 3/2000 | Hunter ......................... 428/72 |
| 6,148,586 A | * | 11/2000 | Jandl ....................... 52/783.17 |
| 6,266,941 B1 | * | 7/2001 | Nishimoto ................. 52/788.1 |
| 6,308,491 B1 | * | 10/2001 | Porter ....................... 52/794.1 |
| 6,322,743 B1 | * | 11/2001 | Stroobants .................. 264/321 |
| 6,412,247 B1 | * | 7/2002 | Menchetti et al. ......... 52/731.1 |
| 6,521,077 B1 | * | 2/2003 | McGivern et al. ....... 156/304.1 |

FOREIGN PATENT DOCUMENTS

| | | | | |
|---|---|---|---|---|
| EP | 0 769 117 B1 | | 9/1998 | |
| JP | 107080 | * | 4/1989 | ............. 52/309.14 |
| JP | 103386 | * | 4/1990 | ............... 312/406 |
| JP | 141939 | * | 5/1994 | ............... 52/309.9 |
| WO | WO 96/32605 A1 | | 10/1996 | |
| WO | WO 00 61503 A1 | | 10/2000 | |
| WO | WO 02/02986 A1 | | 1/2002 | |

* cited by examiner

EVACUATED PANEL FOR THERMAL INSULATION OF A BODY HAVING NON-PLANAR SURFACES

CROSS-REFERENCE TO RELATED APPLICATIONS

This application is a continuation of International Application No. PCT/IT01/00340, filed Jun. 27, 2001, which was published in the English language on Jan. 10, 2002, under International Publication No. WO 02/02987 A1 and the disclosure of which is incorporated herein by reference.

BACKGROUND OF THE INVENTION

The present invention relates to an evacuated panel which enables the thermal insulation of a body having non-planar surfaces to be obtained.

Evacuated panels, and particularly those made with plastic materials, are being increasingly used in all fields where thermal insulation at temperatures lower than about 100° C. is required. As examples of such applications can be mentioned the walls of domestic and industrial refrigerators, of drink dispensing machines (where thermal insulation is required, above all, in order to separate the portion for hot drinks, generally at about 70° C., from the portion for cold drinks), or of containers for isothermal transportation, for instance of drugs or cold or frozen food. Further, applications of these panels in the building field or in the car industry are being studied.

As is known, an evacuated panel is formed of an envelope wherein a filling material is provided. The envelope has the function of preventing (or reducing as much as possible) the entry of atmospheric gases into the panel, so as to maintain a vacuum level compatible with the degree of thermal insulation required by the application. For this purpose, the envelope is made with so-called "barrier" sheets, characterized by having a gas permeability as low as possible, which can be formed of a single component but, more frequently, are multi-layers of different components. In the case of multi-layers the barrier effect is conferred by one of the component layers, whereas the other layers generally have functions of mechanical support and protection of the barrier layer.

The filling material mainly has the function of spacing apart the two opposite faces of the envelope when vacuum is created in the panel, in addition to other features which will be pointed out in the following. This material can be inorganic, such as silica powder, glass fibers, aerogels, diatomaceous earth, etc.; or organic, such as rigid foams of polyurethane or polystyrene, both in the form of boards and of powders. The filling material must, in any event, be porous or discontinuous, so that the porosities or the interstices can be evacuated. Since the permeation of traces of atmospheric gases inside the panel is practically unavoidable, these panels also contain, in most cases, one or more materials (generally referred to as getter materials) capable of sorbing these gases, so as to maintain the pressure inside the panel at the desired values.

Because of the rigidity of the materials they are made of, the known panels generally have a planar conformation, and therefore can be used for the insulation of substantially parallelepiped bodies having planar surfaces, but they are not suitable for bodies having curved surfaces, such as bath-heaters or the piping used for oil transport in the arctic regions, or bodies which are provided with superficial depressions and reliefs.

One of the methods used so far for realizing the thermal insulation of bodies having non-planar surfaces consists in connecting together several flat panels in the shape of bands, for example by sticking together the edges thereof by means of a glue, so as to obtain a composite structure which can be bent along the junction lines, so as to adapt it to the shape of the body to be insulated.

However, in these kinds of structures made of planar panels connected to each other, heat transfers take place at the junctions, and therefore the quality of the heat insulation offered by such structures is poor.

International patent application publication WO096/32605 in the name of the British company ICI describes evacuated rigid panels having a non-planar shape and a method for the manufacture thereof, which consists in making grooves in the filling material, prior to the evacuation step, the grooves being arranged in the desired direction and having suitable width and depth. Subsequently, the filling material is inserted into an envelope, and the assembly is subjected to the evacuation step, whereby the panels bend along the grooves and take on the final, non-planar shape. Finally, the evacuated panel is sealed.

However, it has been observed that in the course of the evacuation the envelope adheres to the filling material and becomes at least partially inserted into the grooves so that, when the evacuation is completed, the thickness of the panel is not regular in all the parts thereof, being thinner at the bending lines compared to the planar portions of the same panel. Consequently, the thermal insulation properties are also not uniform, but are reduced along these bending lines.

Another drawback of the known non-planar panels consists in the risk that the envelope, which is pressed inside the grooves, breaks, thus enabling the passage of atmospheric gases toward the inside of the panel, which compromises permanently the properties of thermal insulation of the panel itself.

A further drawback of the known non-planar panels consists in that their curving (bending) is necessarily accomplished during the evacuation step, that is, during the process of manufacture of the panels. The accomplishment of the curving significantly increases the volume occupied by the panels, whereas it would be convenient to carry out the curving at the time of the final application of the panel, so as to reduce the difficulties and the costs for transport and storage thereof.

BRIEF SUMMARY OF THE INVENTION

Therefore, an object of the present invention is to provide an evacuated panel for thermal insulation of bodies having non-planar surfaces which is free from the drawbacks. The object is achieved by an evacuated panel having two main faces and comprising a flexible envelope, made of one or more barrier sheets, and a filling material, wherein the filling material is formed of at least two boards of an open cell polymeric foam, lying one over the other, each one having a thickness between about 2 and 8 mm. Preferably, plastic sheets are inserted between each pair of adjacent boards in order to favor their reciprocal sliding, and the boards are substantially equal to each other.

In another aspect of the invention, on one or more adjacent boards, one of which is next to the envelope, has at least one cutout having a shape and size coincident with those of a relief provided on a non-planar surface of the body to be insulated. Other features of the invention are described in the following.

An advantage of the evacuated panel according to the present invention consists in that, due to the particular structure of the filling material, it can be bent until it adheres to the walls of the body which is to be insulated, with no grooves in the filling material being necessary.

Another advantage of the evacuated panel according to the present invention consists in that, during the curving, the several creases which are formed on the inner side of the curve, because of their small extent, cannot cause a breaking of the envelope itself nor a resulting permeation of atmospheric gases toward the inside of the panel.

Further, the evacuated panels according to the present invention are manufactured, stored and transported to the place of their final application in a flat form, and only subsequently are they curved so that they adhere to the body to be insulated.

A further advantage of the evacuated panel according to the present invention consists in that it can be manufactured with various thickness values, by using a variable number of boards of filling material of a single kind.

Another advantage of the evacuated panel according to the present invention consists in that, simply and without carrying out milling operations, one or more depressions can be made on the main faces thereof complementary to the reliefs possibly present on the surfaces of the body to be insulated.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
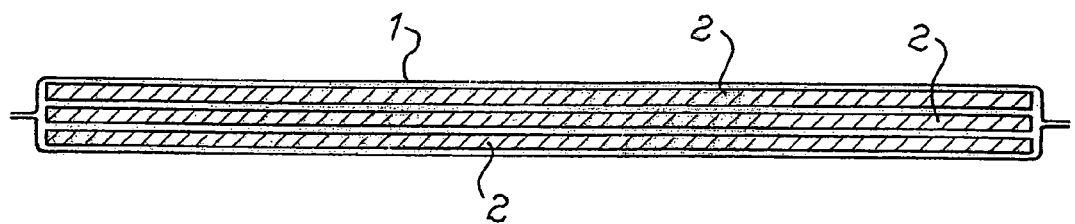
FIG. 1 is a cross-sectional view of an evacuated panel according to a first embodiment of the present invention in a flat conformation thereof.

With reference to FIG. 1, an evacuated panel according to a first embodiment of the present invention is shown which comprises an envelope 1 of known kind formed, for example, of two barrier sheets welded along their edges, and a plurality of thin boards 2 of a filling material, equal to each other and placed one above the other inside the envelope 1. The total thickness of the assembly of boards 2 corresponds to the desired panel thickness, provided with only one board of filling material in the panels known so far.

The boards 2 are preferably made of an open cell polymeric material, and their thickness must be sufficiently small to enable the curving thereof. Depending on the polymeric material used, the thickness of the boards can vary between about 2 and 8 mm. It is preferred to use, as the filling material, boards of polyurethane foam having a thickness of about 4-6 mm. These thickness values can be achieved by cutting the boards usually employed for the manufacture of panels of the known kind horizontally, that is, parallel to their main faces. Alternatively, the thickness of the boards can be reduced by compression, according to a process known in the art.

Figure 2:
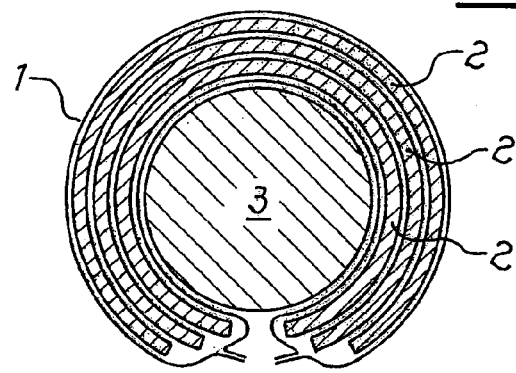
FIG. 2 is a cross-sectional view of the evacuated panel of FIG. 1 in a curved conformation thereof.
Figure 4:
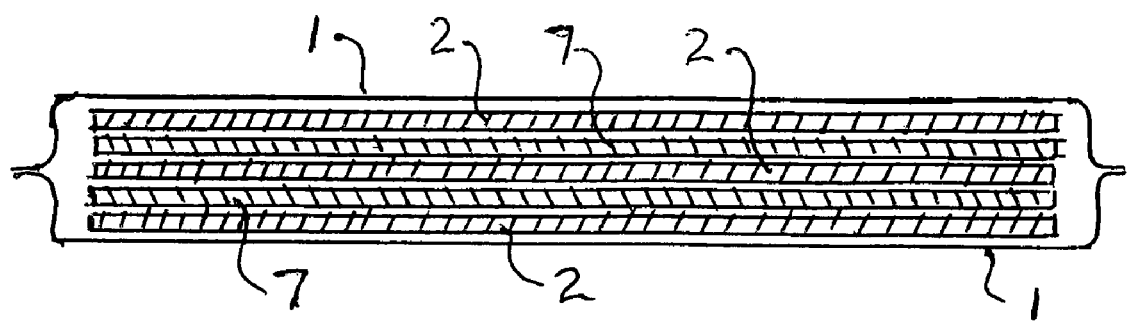
FIG. 4 is a cross-sectional view of an evacuated panel according to a further embodiment of the invention in a flat conformation thereof.

With reference to FIG. 2, the evacuated panel according to FIG. 1 has been curved and placed over the lateral surface of a cylindrical body 3, so as to cover it. Curving the panel is possible due to the small thickness and to the resulting flexibility of the single boards 2 which it comprises. During the curving step, the boards 2 slide on each other, thus reaching different final bending radii, and consequently their ends are not aligned any more. In order to favor reciprocal sliding of the various boards 2, and therefore the curving of the panel, plastic sheets can be inserted between each pair of adjacent boards, as shown in FIG. 4. During the curving step, the boards 2 slide on each other, thus reaching different final bending radii, and consequently their ends are not aligned any more. In order to favor reciprocal sliding of the various boards 2, and therefore the curving of the panel, plastic sheets can be inserted between each pair of adjacent boards.

Figure 3:
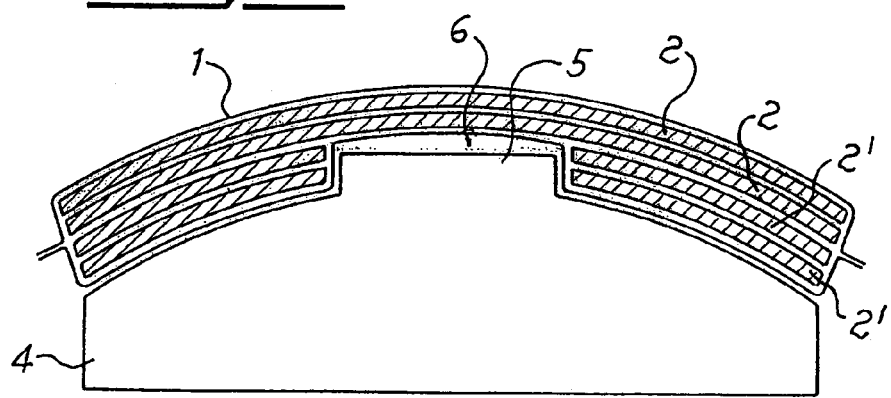
FIG. 3 is a cross-sectional view of an evacuated panel according to a second embodiment of the present invention in a curved conformation thereof.

In FIG. 3 there is shown an evacuated panel according to a particular embodiment of the present invention, placed on the non-planar surface of a body 4. In the particular case here represented, the non-planar surface is a curved surface comprising, for instance, a relief 5.

The evacuated panel is formed of an envelope 1 containing a plurality of boards 2 of filling material, in this case four. Cutouts, having shape and size equal to those of relief 5 of the non-planar surface, have been made in two adjacent boards 2', one of which is next to the envelope 1. Because of the evacuation, the envelope is adherent to the outer surface of the filling material and therefore, at the cutouts, to the surface of the internal board 2 which is not cutout. In this way, one of the main faces of the panel has a depression 6 exactly complementary to the relief 5.

Obviously, the number of the cutout boards 2' and the size of the cutouts depend on the shape of the depression which is desired on one face of the panel.

The panels according to the invention may contain one or more getter materials, that is, materials suitable for chemically sorbing moisture and other atmospheric gases. Preferred is the use of systems of two or three getter materials, containing at least one chemical moisture-sorber and at least one component selected among a transition metal oxide (having the main function of sorption of hydrogen, CO, and hydrocarbons) and an alloy based on barium and lithium (having the main function of nitrogen sorption). Various getter systems of this kind are sold by the SAES Getters S.p.A. under the trademark COMBOGETTER®, among which, in particular, are getter systems containing a moisture sorber and powder of an alloy based on barium and lithium, described in European Patent EP-B-769 117; and getter systems containing a moisture sorber and a transition metal oxide, with the optional addition of powder of an alloy based on barium and lithium, described in European published patent application EP-A-757 920.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An evacuated panel for thermal insulation of a body having non-planar surfaces, the panel having two main faces and consisting of:
    a flexible envelope comprising at least one barrier sheet; and
    a filling material inside the envelope, the filling material formed of at least two boards of an open cell polymeric foam, the boards lying one over another in such a manner that the boards are free to slide over one another at least in a direction parallel to curvature of the boards when the panel is bent, each board having a thickness between about 2 and 8 mm.

2. The evacuated panel according to claim 1, wherein the boards are made of a polyurethane foam, and each board has a thickness of about 4 to 6 mm.

3. The evacuated panel according to claim 1, wherein the boards are substantially equal to each other.

4. The evacuated panel according to claim 1, wherein at least one of the boards, at least one of which is next to the envelope, has at least one cutout therein, the cutout having a shape and size coincident with a shape and size of a relief provided on one of the non-planar surfaces of the body.

5. The evacuated panel according to claim 1, wherein more than one of the boards has at least one cutout therein, and the boards having the at least one cutout are adjacent to each other.

6. The evacuated panel according to claim 1, wherein the envelope is made of at least one multi-layer sheet.

7. The evacuated panel according to claim 1, wherein the boards have sufficient flexibility to allow curving of the evacuated panel with the boards sliding on each other to conform the panel to a non-planar surface.

8. The evacuated panel according to claim 1, wherein the boards have a substantially uniform thickness.

9. The evacuated panel according to claim 1, wherein the boards are substantially flat sheets of polymeric foam.

10. An evacuated panel for thermal insulation of a body having non-planar surfaces, the panel having two main faces and consisting of:
    a flexible envelope comprising at least one barrier sheet;
    a filling material inside the envelope, the filling material formed of at least two boards of an open cell polymeric foam, the boards lying one over another in such a manner that the boards are free to slide over one another at least in a direction parallel to curvature of the boards when the panel is bent; and
    plastic sheets inserted between pairs of adjacent boards to favor reciprocal sliding of the boards relative to each other.

11. The evacuated panel according to claim 10, wherein the boards are made of a polyurethane foam, and each board has a thickness of about 4 to 6 mm.

12. The evacuated panel according to claim 10, wherein the boards are substantially equal to each other.

13. The evacuated panel according to claim 10, wherein at least one of the boards, at least one of which is next to the envelope, has at least one cutout therein, the cutout having a shape and size coincident with a shape and size of a relief provided on one of the non-planar surfaces of the body.

14. The evacuated panel according to claim 13, wherein more than one of the boards has at least one cutout therein, and the boards having the at least one cutout are adjacent to each other.

15. The evacuated panel according to claim 10, wherein the envelope is made of at least one multi-layer sheet.

16. The evacuated panel according to claim 10, wherein the boards have sufficient flexibility to allow curving of the evacuated panel with the boards sliding on each other to conform the panel to a non-planar surface.

17. The evacuated panel according to claim 10, wherein the boards have a substantially uniform thickness.

18. The evacuated panel according to claim 10, wherein the boards are substantially flat sheets of polymeric foam.

19. An evacuated panel for thermal insulation of a body having non-planar surfaces, the panel having two main faces and consisting of:
    a flexible envelope comprising at least one barrier sheet;
    a filling material inside the envelope, the filling material formed of at least two boards of an open cell polymeric foam, the boards lying one over another in such a manner that the boards are free to slide over one another at least in a direction parallel to curvature of the boards when the panel is bent; and
    a getter material contained in the envelope.

20. The evacuated panel according to claim 19, wherein the boards are made of a polyurethane foam, and each board has a thickness of about 4 to 6 mm.

21. The evacuated panel according to claim 19, wherein the boards are substantially equal to each other.

22. The evacuated panel according to claim 19, wherein at least one of the boards, at least one of which is next to the envelope, has at least one cutout therein, the cutout having a shape and size coincident with a shape and size of a relief provided on one of the non-planar surfaces of the body.

23. The evacuated panel according to claim 22, wherein more than one of the boards has at least one cutout therein, and the boards having the at least one cutout are adjacent to each other.

24. The evacuated panel according to claim 19, wherein the envelope is made of at least one multi-layer sheet.

25. The evacuated panel according to claim 19, wherein the boards have sufficient flexibility to allow curving of the evacuated panel with the boards sliding on each other to conform the panel to a non-planar surface.

26. The evacuated panel according to claim 19, wherein the boards have a substantially uniform thickness.

27. The evacuated panel according to claim 19, wherein the boards are substantially flat sheets of polymeric foam.

28. The evacuated panel according to claim 19, wherein the getter material comprises at least one chemical moisture sorber and at least one compound selected from the group consisting of a transition metal oxide and an alloy based on barium and lithium.

29. An evacuated panel for thermal insulation of a body having non-planar surfaces, the panel having two main faces and consisting of:
    a flexible envelope comprising at least one barrier sheet;
    a filling material inside the envelope, the filling material formed of at least two boards of an open cell polymeric foam, the boards lying one over another in such a manner that the boards are free to slide over one another at least in a direction parallel to curvature of the boards when the panel is bent;
    plastic sheets inserted between pairs of adjacent boards to favor reciprocal sliding of the boards relative to each other; and
    a getter material contained in the envelope.

30. The evacuated panel according to claim 29, wherein the boards are made of a polyurethane foam, and each board has a thickness of about 4 to 6 mm.

31. The evacuated panel according to claim 29, wherein the boards are substantially equal to each other.

32. The evacuated panel according to claim 29, wherein at least one of the boards, at least one of which is next to the envelope, has at least one cutout therein, the cutout having a shape and size coincident with a shape and size of a relief provided on one of the non-planar surfaces of the body.

33. The evacuated panel according to claim 32, wherein more than one of the boards has at least one cutout therein, and the boards having the at least one cutout are adjacent to each other.

34. The evacuated panel according to claim 29, wherein the envelope is made of at least one multi-layer sheet.

35. The evacuated panel according to claim 29, wherein the boards have sufficient flexibility to allow curving of the evacuated panel with the boards sliding on each other to conform the panel to a non-planar surface.

36. The evacuated panel according to claim 29, wherein the boards have a substantially uniform thickness.

37. The evacuated panel according to claim 29, wherein the boards are substantially flat sheets of polymeric foam.

38. The evacuated panel according to claim 29, wherein the getter material comprises at least one chemical moisture sorber and at least one compound selected from the group consisting of a transition metal oxide and an alloy based on barium and lithium.

39. An evacuated panel for thermal insulation of a body having non-planar surfaces, the panel having two main faces and comprising:
   a flexible envelope comprising at least one barrier sheet;
   a filling material inside the envelope, the filling material formed of at least two boards of an open cell polymeric foam, the boards lying one over another and being substantially flat sheets having sufficient flexibility to allow curving of the evacuated panel with the boards sliding directly on each other to conform the panel to a non-planar surface.

40. The evacuated panel according to claim 39, wherein the boards are made of a polyurethane foam, and each board has a thickness between about 2 and 8 mm.

41. The evacuated panel according to claim 39, wherein the boards are substantially equal to each other.

42. The evacuated panel according to claim 39, wherein at least one of the boards, at least one of which is next to the envelope, has at least one cutout therein, the cutout having a shape and size coincident with a shape and size of a relief provided on one of the non-planar surfaces of the body.

43. The evacuated panel according to claim 42, wherein more than one of the boards has at least one cutout therein, and the boards having the at least one cutout are adjacent to each other.

44. The evacuated panel according to claim 39, wherein the envelope is made of at least one multi-layer sheet.

45. The evacuated panel according to claim 39, wherein the boards have sufficient flexibility to allow curving of the evacuated panel with the boards sliding on each other to conform the panel to a non-planar surface.

46. The evacuated panel according to claim 39, wherein the boards have a substantially uniform thickness.

47. The evacuated panel according to claim 39, further comprising a getter material contained in the envelope.

48. The evacuated panel according to claim 47, wherein the getter material comprises at least one chemical moisture sorber and at least one compound selected from the group consisting of a transition metal oxide and an alloy based on barium and lithium.

* * * * *